(12) United States Patent
van Heyden et al.

(10) Patent No.: US 6,486,583 B2
(45) Date of Patent: Nov. 26, 2002

(54) ELECTROMAGNETO-MECHANICAL CONVERTER

(75) Inventors: Marcus van Heyden; Alfred Tareilus, both of Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 26 days.

(21) Appl. No.: 09/792,944

(22) Filed: Feb. 26, 2001

(65) Prior Publication Data

US 2001/0011855 A1 Aug. 9, 2001

(51) Int. Cl.⁷ .............................. H02K 1/22; H02K 1/12
(52) U.S. Cl. ........................................ 310/218; 310/259
(58) Field of Search .............................. 310/216, 217, 310/218, 254, 256, 259, 269

(56) References Cited

U.S. PATENT DOCUMENTS

| | | | | |
|---|---|---|---|---|
| 3,827,141 A | * | 8/1974 | Hallerback | 29/596 |
| 3,849,683 A | * | 11/1974 | Leistner | 310/183 |
| 4,912,353 A | * | 3/1990 | Kondo et al. | 310/216 |
| 5,091,668 A | * | 2/1992 | Cuenot et al. | 310/156.61 |
| 5,422,530 A | * | 6/1995 | Nolle | 310/218 |
| 5,457,350 A | * | 10/1995 | Sakamaki et al. | 310/216 |
| 5,918,360 A | * | 7/1999 | Forbes et al. | 29/596 |
| 6,369,483 B1 | * | 4/2002 | Hill | 310/216 |

FOREIGN PATENT DOCUMENTS

| | | | |
|---|---|---|---|
| DE | 875227 | * | 4/1953 |
| DE | 196 43 561 | | 1/1998 |
| DE | 197 57 136 | | 6/1999 |

OTHER PUBLICATIONS

Patent Abstracts of Japan, vol. 2000, No. 07, Sep. 29, 2000, JP 2000125525 (Denso Corp.).
Patent Abstracts of Japan, vol. 2000, No. 08, Oct. 6, 2000, JP 2000 134833 (Kofu Meidensha:KK).
Patent Abstracts of Japan, vol. 009, No. 136, Jun. 12, 1985, JP 60 020735 (Shinko Denki KK).
Patent Abstracts of Japan, vol. 1997, No. 02, Feb. 28, 1997, JP 08 275415 (Matsushita Seiko Co.).

* cited by examiner

*Primary Examiner*—Nestor Ramirez
*Assistant Examiner*—Dang Dinh Le
(74) *Attorney, Agent, or Firm*—Cohen, Pontani, Lieberman & Pavane

(57) ABSTRACT

An electromagneto-mechanical converter has winding teeth composed of a material which is suitable for carrying a magnetic flux of a magnetic circuit. The winding teeth each have a winding support element for accommodating a winding, an attachment region for attaching the winding tooth to a yoke of the electromagneto-mechanical energy converter, and a transition element which tapers from the winding supporting element to the attachment region and is immediately adjacent to the yoke of the electromagneto-mechanical converter. The attachment region has a magnetic reluctance which is greater than that of the winding supporting element and the transitional element owing to a change in the grain structure of the material, so that the magnetic flux which enters the transitional element from the winding supporting element is substantially passed from the transitional element into the yoke, and the attachment region is substantially free of magnetic flux.

16 Claims, 2 Drawing Sheets

ELECTROMAGNETO-MECHANICAL CONVERTER

BACKGROUND OF THE INVENTION

1. Field of the Invention

The present invention relates to all electromagneto-mechanical converter having a number of winding teeth composed of a material which is suitable for carrying a magnetic flux of a magnetic circuit. The winding teeth each have a winding supporting element for holding a winding and an attachment region which is intended for attaching the winding tooth to a yoke of the electromagneto-mechanical converter.

2. Description of the Related Art

Electromagneto-mechanical converters are rotating electrical machines which, using a magnetic field, can either convert electrical energy into mechanical energy using the motor principle, or can convert mechanical energy into electrical energy using the generator principle.

Electrical machines such as these, which may, for example, be in the form of synchronous machines or asynchronous machines, have a stationary part, which is called the stator, and a rotating part, which is called the rotor. Depending on the configuration of the electrical machine, the stator and the rotor are generally composed of a laminated core which is formed from a yoke and a number of winding teeth. An electrical winding (coil) is arranged in the slots between these winding teeth. When a current flows trough these windings, it produces a magnetic field in the electrical machine.

The windings are associated with individual winding sections, with the windings that are associated with a common winding section being connected to one another. In the case of a three-phase machine, there are a total of m winding sections, to each of which current is applied with a phase offset of 360°/m.

The laminated core with its electromagnetic components is generally referred to as a magnetic circuit. In the already known, conventional magnetic circuit configurations, the laminated cores which carry the windings are frequently integral. This means that the yoke and the winding teeth are in the form of a single component. However, this configuration of the laminated core has a number of disadvantages. Firstly, the laminated core itself can be produced only with a high level of structural complexity. Furthermore, it is difficult to insert the windings in the slots. In addition, there is a serious disadvantage in that it is impossible to use a preferred direction for the magnetic flux in the winding teeth since the magnetic circuit is produced either as a complete section or in segments (60° elements).

Magnetic circuit configurations are also known in which the laminated cores are in two pieces. This means that both the yoke and the individual winding teeth are first of all manufactured as separate components, and are then joined together to form a single, common laminated core. In the known solutions, winding teeth are connected to the yoke, for example, by means of a screw connection or a dovetail joint. Even though, with this solution, the windings can be fit to the winding teeth considerably more easily than in the case of integral solutions, the known two-piece laminated cores also have a number of disadvantages. For example, in production-engineering terms, it is complex to connect the winding teeth to the yoke via a screw connection or a dovetail joint.

For example, when using a dovetail joint, the winding teeth generally have specially designed keyways which are inserted at the side into correspondingly designed slots in the yoke Owing to the fact that the winding tooth is formed from a number of individual elements, side insertion for the dovetail solution results in sliding tracks, however, which produce undesirable electrical connections in the winding tooth, leading to losses, for example eddy current losses.

Furthermore, the known solutions often comprise components generally rotors) which do not carry an alternating flux and are thus in the form of massy components.

In order to allow electromagneto-mechanical converters of the said type to be operated in a particularly advantageous manner, it is necessary to be able to transfer the magnetic flux through the winding teeth to the yoke as completely as possible, and as far as possible without losses. However, this is feasible only with limitations with any of the solutions which have been described above and are known from the prior art.

DE 197 57 136, to which WO99/33157 corresponds, discloses an electromagneto-mechanical converter of this generic type whose winding teeth have a tooth head, a winding supporting element and an attachment region immediately adjacent to it. The yoke and winding teeth are composed of stamped laminates. The outer boundary of the attachment region of the winding teeth and the corresponding attachment region of the yoke have a dovetail-like contour. The winding teeth are connected to the yoke by being pushed in in the axial direction of the annular yoke. Furthermore, the boundary surface between the winding teeth and the yoke has an air gap in places. A disadvantage of this solution is that winding teeth and the yoke are damaged in the region of the boundary surface due to the inadvertent production of a short-circuit, as already stated further above, which prevents the magnetic flux from passing from the winding teeth to the yoke without losses. The magnetic flux (which is cried in the radial direction with respect to the yoke) in the winding region passes directly into the attachment region, and from there to the yoke. In the process, the magnetic lines of force necessarily cross over the attachment region (which is damaged by the stamping process) of the winding tooth and yoke, which males it considerably more difficult for the lines of force to make this transition. In this respect, the air gap which is formed in places on the boundary surface also has a negative effect.

The teaching in DE 196 43 561, to which WO98/18189 corresponds, refers to an electrical machine which is not of this generic type but has a single-pole winding, in which individual segments carry the magnetic flux mainly in the radial direction of the electrical machine, and in which the segments are advantageously produced from oriented-grain magnetic sheet steel. This solution has no yoke to produce a mechanical connection to the individual poles and to carry the magnetic flux. Instead of this, segments, some of which are of different designs, engage in one another alternately and support one another. However, this solution also involves the problem that the magnetic flux has to cross over the attachment regions of the individual poles directly.

SUMMARY OF THE INVENTION

The invention has the object of allowing the magnetic flux to pass from the winding tooth to the yoke as completely as possible and with as few losses as possible. Furthermore, it is intended to fix the winding tooth, which may have been provided with a winding in advance, to or in the yoke in a simple and cost-effective manner According to the present invention, the object is achieved by an electromagneto-mechanical converter whose winding teeth have a transitional element which tapers from the winding supporting element to the attachment region and is immediately adjacent to the yoke of the electromagneto-mechanical converter. The attachment region has a magnetic reluctance which is greater than that of the winding supporting element and the transitional element owing to a change in the grain structure of the material, so that the magnetic flux which enters the transitional element from the winding supporting element is substantially passed from the transitional element into the yoke, and the attachment region is substantially free of magnetic flux.

Accordingly, the idea on which the invention is based is to physically separate the functions carried out by a winding tooth, namely carrying a magnetic flux, and the production of a mechanical connection to a yoke.

Thus, in the winding tooth, the magnetic flux is carried virtually exclusively by the winding supporting element and by the tapering transitional element, which extends from the winding supporting element to the attachment region. The winding supporting element and the transitional element thus form a flux guidance region for the magnetic flux. The tapering transitional element also makes it possible to prevent the winding tooth from being levered out of the yoke by transverse forces which occur during operation of the electromagneto-mechanical converter.

The attachment region, which is adjacent to the flux guidance region, presents a magnetic reluctance which is greater than that of the adjacent regions owing to a local change in its structure, and thus magnetic, characteristics for the magnetic flux. However, since the magnetic flux follows the path of least magnetic reluctance, it will avoid the attachment region, and not enter it, or enter it only to an insignificant extent. This means that the magnetic flux will leave the winding tooth before reaching the attachment region, and will essentially enter the adjacent yoke from the transitional region.

The electromagneto-mechanical converter according to the invention is thus suitable for transferring the magnetic flux produced by the windings energized by the current, from the winding tooth to the yoke, completely and essentially without any losses. The invention allows magnetic circuits with production-engineering and qualitative advantages to be constructed.

The winding supporting element is particularly suitable for accommodating the winding. The winding teeth can be wound by machine before connection to the yoke, thus resulting in not only production-engineering but also quality advantages. For example, this form of winding make it possible to insert up to 15% more copper into the slots.

The winding tooth can then be attached to a yoke of the electromagneto-mechanical energy converter via the attachment region. The yoke may have, for example, a circular configuration, with the individual winding teeth being arranged on one surface of the yoke such that they extend radially outward or inward from the yoke, depending on whether this is an external-rotor or internal-rotor design.

By way of example, this can be done in such a way that the winding tooth is inserted into the yoke from the yoke surface, thus making it possible to prevent disadvantageous axial movement, as in the case of the dovetail solution. A solution such as this will be explained in more detail in the rest of the description.

The use of a soft-magnetic material, in particular a soft-magnetic material with high permeability, makes it possible to justify the claim that the flux is carried with low losses but completely. Soft-magnetic materials are advantageously used for magnetic circuits whose magnetization directions are changed continually. First of all, the soft-magnetic material makes it possible to keep the hysteresis losses low.

A winding tooth advantageously comprises a number of individual elements which are in the form of plates which are stacked one above the other, and are connected to one another. Eddy current losses can also be reduced by using a material with high electrical resistivity and by subdividing the winding tooth in individual elements in the form of discs. In this way, the losses which result from changes in the magnetization direction in the winding tooth can be reduced by designing the winding tooth according to the invention, The individual elements can be produced in a simple and cost-effective manner, for example by means of a stamping process or the like. The individual elements are then joined together to form a winding tooth. In general, the term "in the form of plates" refers to any three-dimensional, flat configuration which has a considerably larger plan area than its height or thickness, with the plan area being formed by the length and width of the individual element.

The individual elements of the winding teeth can be connected to one another in some suitable way. Thus, for example, the individual elements can be pushed together via so-called core-assembly studs which are formed on the surfaces of individual elements, and via accommodation openings, which correspond to these studs, for the core-assembly studs, which are formed in respective individual elements adjacent to the individual elements provided with the studs, and they are thus connected to one another. It is also possible for the various individual elements to be bonded to one another, or to be connected to one another via a suitable bracket joint. The invention is not limited to specific types of connection for the individual elements.

The winding tooth produced in tis way can now simply be wound directly. The winding tooth, fit with the winding, is then connected to the yoke. There would be no point in the link to the yoke by means of screws in the radial direction, either from the production-engineering point of view or in terms of losses. For example, in the case of winding teeth with an alternating flux and/or dimensions, situations could occur in which the screws would be softened.

The grain structure of the material advantageously has a preferred direction. An oriented-grain material generally has the advantage that it has a magnetic preferred direction. Since magnetic flux is carried mainly in the radial direction in the winding tooth, the use of an oriented-grain material makes it possible to achieve particularly good loss and permeability characteristics in the flux direction.

It is furthermore preferable to use an oriented-grain metal as the soft-magnetic material. A material such as this can very easily be magnetized in the preferred direction, Only a small magnetization current is therefore required for a given magnetic flux density in this magnetic preferred direction. Conversely, a higher flux density can be achieved for a given magnetization in oriented-grain materials than is possible in non-oriented materials. In addition, the losses, for example losses resulting from changes in the magnetization direction, iron losses and the like, are particularly low in the magnetic preferred direction in oriented-grain materials. The invention is not limited to specific oriented-grain metals or to a specific grain orientation. The only important factor is that the grain orientation of the metal is chosen such that the magnetic flux to be carried can pass through the winding tooth, and can enter the yoke) in the preferred direction.

In a further advantageous refinement, the individual elements are formed from magnetic sheet steel. Such magnetic sheet steels are preferably cold-rolled, are then intermediately annealed, and are finally rolled cold to the desired final thickness. After this, the laminates are normally subjected to further annealing. The cold-rolling and annealing treatment results in the crystals in the laminate being arranged such that their edges run in the same direction. This phenomenon is referred to as grain orientation. The oriented grain laminate produced in this way can be magnetized very easily in the rolling direction, so that the rolling direction governs the magnetic preferred direction.

The individual elements can preferably be produced by means of a stamping process. The use of a stamping process first of all allows the individual elements to be produced very easily and cost-effectively. Furthermore, a stamping process results in a number of phenomena which can be used advantageously for deliberate adjustment and guidance of the magnetic flux through the winding tooth in the yoke.

A stamping process results in the structure of the individual element, which is formed, for example, from magnetic sheet steel, being considerably damaged in the edge region. The width of this damaged edge region amounts to approximately one to two thicknesses of the laminate. The relative permeability is reduced in the damaged region, and this results in increased magnetic reluctance. Furthermore, the hysteresis losses rise in this region. Both effects have a disadvantageous effect on the magnetic flux and are therefore fundamentally undesirable in the design of an electromagneto-mechanical converter.

If these said effects are not considered in the design of the magnetic circuit, in particular in the design of the junction point between the winding tooth and yoke, this can lead to the magnetic flux through the winding tooth being reduced, so that the magnetic flux cannot be transferred completely to the yoke.

The present invention makes use of precisely these effects, which actually have a negative influence, to control the magnetic flux through the winding tooth to the yoke.

The flux guidance region formed from the winding supporting element and the transitional element can preferably be larger than the attachment region. As has already been stated further above, the structure of the individual element is damaged considerably in the edge region during a stamping process. If the flux guidance region is large, this means that although the edge regions are damaged, there is still a large remaining area through which the magnetic flux can pass optimally. If the attachment region is smaller than the flux guidance region, this means that a larger percentage of the attachment region than of the flux guidance region is damaged during the stamping process. This makes it harder for the magnetic flux to pass through the attachment region, and this can be used in order to allow the magnetic flux to enter the yoke in a controlled manner from the winding tooth, for example in the transitional region itself. In the transitional region, the flux into the yoke is controlled in an optimum manner by the winding tooth, taking account of the material damage caused by the stamping process. Ideally, no lines of force any longer pass through the attachment region.

The attachment region may advantageously have an attachment apparatus for force-fitting and/or positively-locking connection to a yoke of the electromagneto-mechanical converter.

To this end, it is preferable for the attachment apparatus to be in the form of a clamping device, in which case the clamping device may have one or more cutout or cutouts and/or formed-out region or regions.

It is furthermore advantageous for the winding element of a winding tooth to have a tooth head at its free end facing away from the yoke, since it has a greater width than the winding supporting element in order to make it impossible for the winding to slide off the winding tooth inadvertently.

A total of 36 winding teeth can advantageously be provided on the electromagneto-mechanical converter. In this case, there is no need for all the winding teeth each to have their own Winding. For example, it is feasible for only every other winding tooth to have an electrical winding. However, the invention is not limited to a specific number of winding teeth or windings, so that the number of winding teeth and windings can be varied as required and depending on the application.

The yoke may advantageously have a number of slots to accommodate the winding teeth. In one such refinement of the laminated core, the individual winding teeth can first be fit with a winding before being connected to the yoke. The winding teeth can then easily be inserted radially into the yoke. This has considerable advantages over known connections, in particular over a dovetail joint.

In order to achieve an advantageous connection between a winding tooth and yoke, the slots may have one or more cutout or cutouts and/or formed-out region or regions, which corresponds or correspond to the cutout or cutouts and/or formed-out region or regions in the clamping device of a respective winding tooth. This makes it possible to produce an appropriate latching connection, snap-action connection or the like between the winding tooth and the yoke. Connections such as these have the advantage that, on the one hand, they can be produced very easily while, on the other hand, they allow a force-fitting and/or positively-locking connection. If the connection between a winding tooth and yoke is produced by means of a latching connection or snap-action connection, the winding tooth is inserted into the corresponding slot in the yoke. Incorporation of suitable cutouts in the attachment region of the winding tooth makes it possible for tie winding tooth to be compressed, for example, while being pushed into the slot. This allows corresponding formed-out regions in the attachment region (which may, for example, be in the form of latching tabs, snap-action hooks or the like) to be inserted into the slot. When the formed-out regions of the attachment region come into contact with corresponding cutouts in the slots, the formed-out regions in the attachment region of the winding tooth can latch, or can be snapped into the corresponding cutouts by virtue of the restoring forces resulting from this compression. This results in a particularly firm connection between the winding tooth and yoke, which cannot become detached inadvertently during operation of the electromagneto-mechanical converter, either.

Seen from the surface of the yoke, the slots may advantageously have a tapering accommodation region and a holding region, adjacent to it, for the attachment region of a respective winding tooth. Furthermore, the tapering accommodation region may be designed to accommodate the transitional element (which is likewise tapering) from the flux guidance region of the winding tooth. In consequence, the transitional region of the winding tooth is recessed in the yoke, which allows the magnetic lines of force to enter the yoke from the transitional region completely. This furthermore results in a particularly close connection between the winding tooth and the yoke, which also securely withstands any transverse forces that occur. It is quite normal for transverse forces which push against the winding teeth from the left and right to occur during operation of an electromagneto-mechanical converter. These transverse forces can lead to the winding teeth being levered out of the yoke during operation. This risk is prevented by the tapering accommodation region of the slot, and by the transitional region of the winding tooth, which likewise tapers in a corresponding manner. When assembled, the two tapering regions rest against one another, so that the friction between the winding tooth and the yoke results in self-locking to prevent sliding out. In this case, the taper angle α by which the two regions each taper is particularly important. Flat angles have advantages in terms of flux guidance. Steep angles assist the self-locking process and also reduce the influence of stacking faults between the individual elements. A suitable taper angle α may therefore be chosen depending on the requirement and the application. An appropriately chosen taper angle α allows the self-locking to be chosen to be sufficiently large to allow the transverse forces acting on the attachment region of the winding tooth to be minimized.

The electromagneto-mechanical converter is advantageously in the form of a synchronous machine, in particular a permanent-magnet synchronous machine.

The configuration of a winding tooth according to the invention as described above will now be explained with reference to a specific example, although the invention is not limited to his specific embodiment.

If the attachment apparatus is in the form of a clamping device, the winding tooth can be connected to a yoke via, for example, a latching connection or a snap-action connection. In order to ensure such a connection, the attachment region may include fine structures of cutouts and/or formed-out regions (for example latching tabs, snap-action hooks or the like). If the individual elements of the winding tooth are produced by means of a stamping process, this means that the grain structure of the attachment region is particularly damaged during the stamping process. This is due firstly to the fact that the attachment region is considerably smaller, for example narrower, than the flux guidance region. Furthermore, stamping in formed-out regions and/or cutouts in the attachment region increases the number of edge sections which are particularly damaged during the stamping process, so that a large proportion of the attachment region is damaged during the stamping process. The attachment region thus has a high magnetic reluctance and is therefore not very suitable at all for guiding the magnetic flux. Furthermore, on those parts of the contour of the clamping device which are connected to the yoke, when the winding tooth is being attached to the yoke, this connection results in electrical short-circuits. Undesirable eddy currents can likewise be formed in this region with appropriate flux linkage, and these additionally impede the magnetic flux.

These effects that occur and are fundamentally negative in nature can now be used advantageously if the winding tooth is configured appropriately.

If the individual elements of the winding tooth are in the form of oriented-grain laminates, care must be taken when inserting them into the stamping tool to ensure that the magnetic flux is guided in the preferred direction for that material. This preferred direction can be chosen, for example, such that the magnetic flux runs from the winding support element in the direction of the attachment region. In the flux guidance region, the magnetic flux runs with relatively little impediment, since this region is relatively large, for example broad, in comparison to the attachment region, so that the edge areas which are damaged in the stamping process represent only a small percentage of the flux guidance region. Owing to the high magnetic reluctance in the attachment region which can result from the effects mentioned above, the magnetic flux will attempt to find the path of least resistance. This means that, for example, the magnetic flux does not pass through the attachment region, but is deflected before it, so that the flux can emerge, for example, from the winding tooth into the yoke in the region of the transitional element from the flux guidance region. Since the amount of damage in this region is likewise not very great, the magnetic flux can be transferred approximately completely and without losses from the winding tooth to the yoke.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
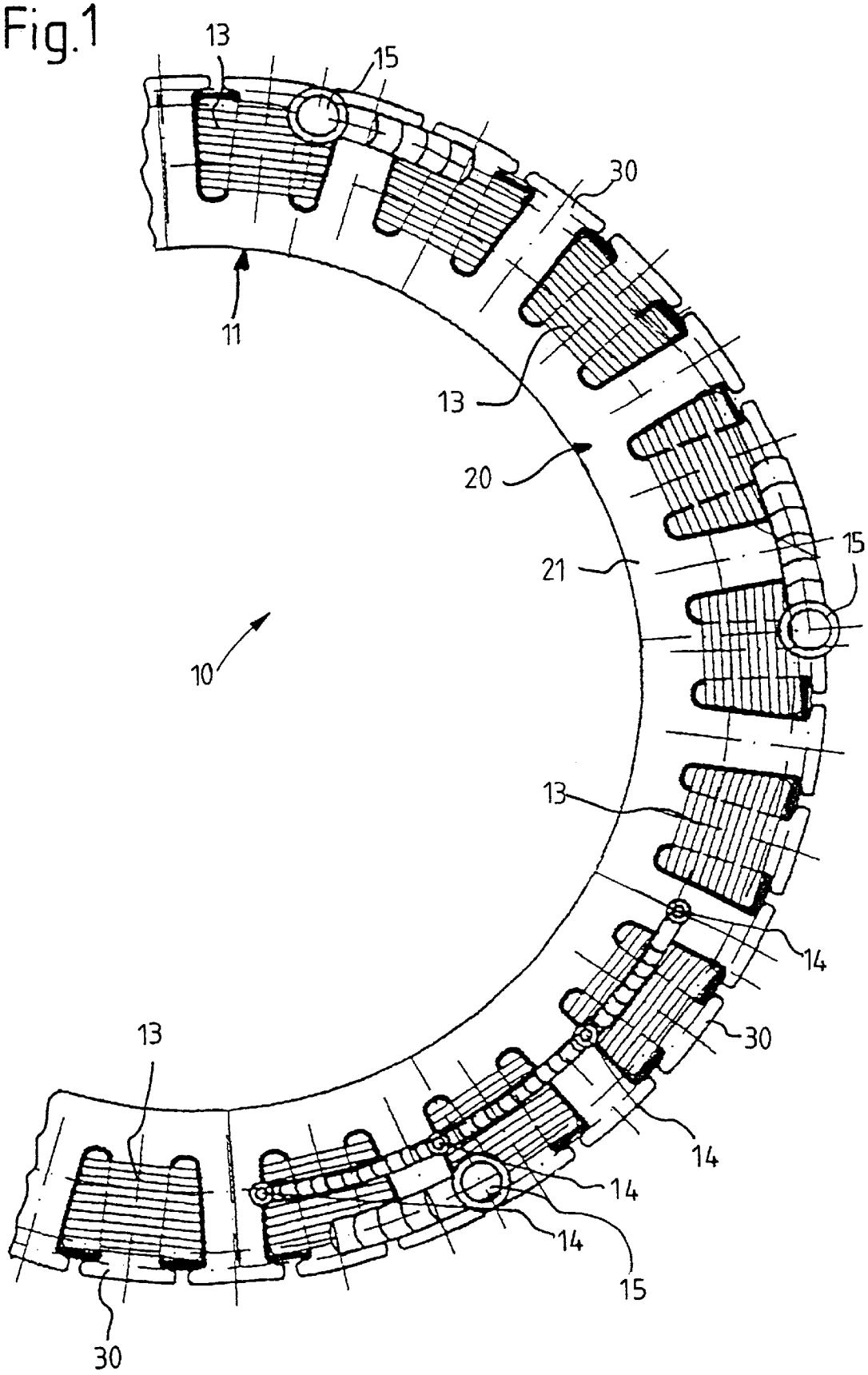
FIG. 1 shows a schematic view of one example of a laminated core with corresponding windings.

FIG. 1 shows a subregion of an electromagneto-mechanical converter 10 in the form of a permanent-magnet synchronous machine. The subregion illustrated is an illustration of part of a stator 11. The subregion of the stator 11 illustrated in FIG. 1 is intended to provide an overview of how the individual elements are arranged with respect to one another. In this case, the stator 11 illustrated in FIG. 1 is a solution variant as is already known from the prior art. The stator 11 has a laminated core 20 which is formed from a yoke 21 and a number of winding teeth 30. The present exemplary embodiment illustrates an integral laminated core 20, which means that the yoke 21 and the winding teeth 30 are formed integrally.

Some of the winding teeth 30, in the present example every other winding tooth 30, are fit with an electrical winding 13. The windings 13 are associated with individual winding elements with the windings associated with the common winding elements being interconnected. In the case of a three-phase machine, the stator 11 has three winding elements, which each have current applied to them phase-shifted through 120°. For this purpose, the individual winding elements are connected to corresponding cable connections 15. A number of temperature sensors 14 are provided in order to allow the heat generated in the stator 11 during operation of the electrical machine 10 to be measured.

The integral embodiment of the laminated core 20 illustrated in FIG. 1 has the disadvantages described further above relating to the prior art. In order to avoid these disadvantages, the laminated core 20 can be refined in the manner illustrated in FIG. 2.

Figure 2:
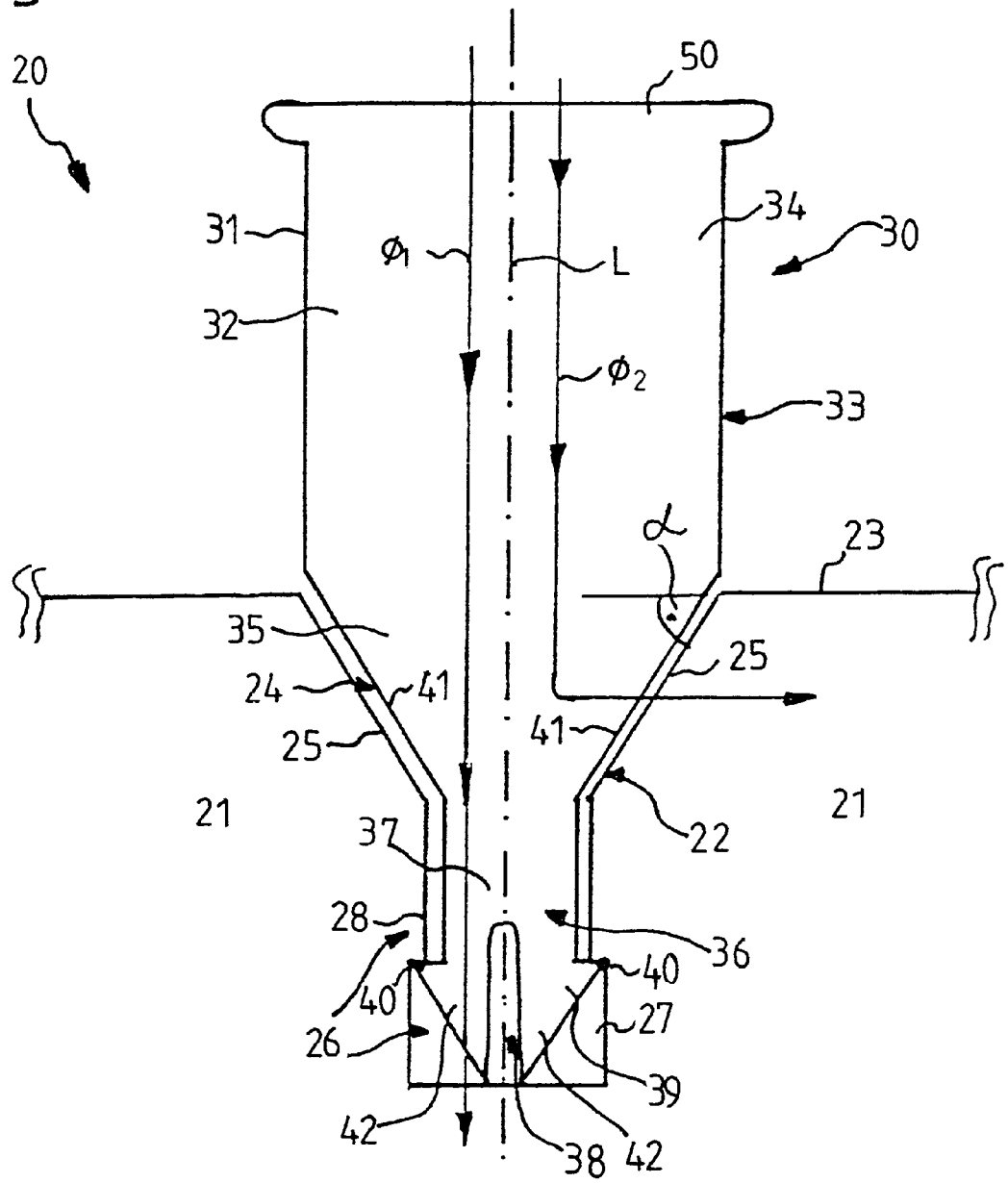
FIG. 2 shows a schematic view of a first embodiment according to the invention of a winding tooth connected to a yoke.

FIG. 2 shows a schematic view of the laminated core 20. The laminated core 20 has a yoke 21, which may have a circular configuration, as illustrated in FIG. 1.

A number of slots 22 are provided in the yoke 21 in order to accommodate the winding teeth 30. Id this case, the number of slots 22 corresponds to the number of winding teeth 30 used. The winding teeth 30 are inserted into the slots 20.

The winding teeth 30 each comprise a number of individual elements 31 which are in the form of plates, are stacked vertically one behind the other, are connected to one another and, overall, form the winding tooth 30. The individual elements 31 are each stamped from an oriented-grain magnetic steel sheet. The individual elements 31 can be connected via corresponding core-assembly studs, a bonded joint or the like.

The winding tooth 30 has a flux guidance region 33 for accommodating a winding 13, and an attachment region 36, adjacent to it, for attachment of the winding tooth 30 to the yoke 21.

In principle, all materials which are suitable for carrying a magnetic flux can, of course, be used for the invention. For example, even alloys, in particular metal alloys or else alloys which contain semiconductive elements such as silicon, are suitable as materials for the above-mentioned purpose.

The attachment region 36 comprises an attachment apparatus 37 which is in the form of a clamping device and has a number of cutouts 38 and formed-out regions 39. The cutout 38 divides the attachment apparatus 37 into two clamping limbs 42, which each have a formed-out region 39. This makes it possible for the two clamping limbs 42 to be compressed during insertion of the winding tooth 30 into the slot 22 to such an extent that the formed-out regions 39, which are in the form of latching tabs or snap-action hooks, can be inserted into the slot 22.

In order to obtain a force-fitting and positively-locking connection between the winding tooth 30 and the yoke 21, the slot 22 has an entry region 24, a compression region 28, and a retaining region 26 formed by cutouts 27. When the winding tooth 30 is being inserted into the slot 22, the two clamping limbs 42 of the attachment apparatus 37 are compressed in the compression region 28. The compression of the clamping limbs 42, which is made possible by the cutout 38 in the attachment apparatus 37, results in restoring forces being produced in the attachment apparatus 37, which try to force the clamping limbs 42 outward again, and thus into their original position. Once the winding tooth 30 has been pushed sufficiently into the slot 22 so that the formed-out regions 39 reach the cutouts 27 in the retaining region 26, the clamping limbs 42 can return to their original position. In consequence, the formed-out regions 39 in the attachment apparatus 37 engage the holding points or shoulders 40, thus producing a force-fitting and positively-locking connection between the winding tooth 30 and the yoke 21.

The flux guidance region 33 has a winding supporting element 34, which is connected to the attachment region 36 via a transitional element 35. The winding supporting element 34 is used to accommodate the winding 13 (see FIG. 1). The winding tooth 30 has a tooth head 50 at its free end facing away from the yoke 21. In addition to its electromagnetic function, this tooth head 50 also carries out the task of holding the winding 13 in the slot.

During operation of the electromagneto-mechanical converter 10, transverse forces likewise occur, which act against the winding teeth 30 from the left and right. In order to prevent such transverse forces from levering the winding teeth 30 out of the slot 22 in the yoke 21, both the transitional element 35 and an entry region 24 (which corresponds to it) in the slot 22 are designed such that they taper at a taper angle α. In this case, the taper is produced as follows:

In a plan view of an outer surface 32 of the individual element 31 of the winding tooth 30, as illustrated in FIG. 2, it can be seen that the longitudinal axis L of the winding tooth 30 extends from the tooth head 50 to the attachment region 36. The longitudinal axis L of the winding tooth 30 thus runs radially with respect to the yoke 21.

As can be seen from FIG. 2, the winding supporting element 34 of the flux guidance region 33 has a quadrilateral configuration, which is used to accommodate the winding. The winding supporting element 34 is substantially wider than the attachment region 36. The transitional element 35 between the winding supporting element 34 and the attachment region 36 has side walls 41 which taper from the winding supporting element 34 toward the attachment region 36. In the same way, the side walls 25 of the entry region 24 taper by the taper angle α. If the taper angle α is chosen to be relatively large, this improves the self-locking to prevent the winding tooth 30 from sliding out of the slot 22. This self-locking is produced by the friction between the winding tooth 30 and the yoke 21 in the region of the transitional element 35 and of the entry region 24.

To produce the laminated core 20, the winding tooth 30 is produced by stamping the individual elements 31 from an oriented-grain magnetic steel sheet and then stacking them one behind the other vertically and connecting them to one another. In this way, the totality of the individual elements 31 forms the winding tooth 30. An electrical winding is now pushed onto the winding tooth 30 from the direction of the attachment region 36. It is also possible for the winding process to be carried out directly on the winding tooth 30. The winding tooth 30 is then inserted radially into the slot 22 in the yoke 21, so as to produce a positively-locking and force-fitting latching or snap-action connection. A bonded joint is also feasible here. The winding is now held securely in the region of the winding supporting element 34 between the tooth head 50 and the outer surface 23 of the yoke 21.

During operation of the electromagneto-mechanical converter 10, electrical current is applied to the windings. The magnetic flux produced by the Stator and rotor can be passed along a magnetic preferred direction, parallel to the longitudinal axis L, owing to the grain orientation in the individual elements 31.

The stamping process results in the grain structure of the individual lutes 31 being disturbed considerably in their edge region, that is to say a region which corresponds approximately to one to two laminate thicknesses. The relative permeability is thus reduced in this region, resulting in increased magnetic reluctance, and thus a reduction in the magnetic flux. Furthermore, the hysteresis losses rise in the damaged region. Both these effects are fundamentally undesirable in the design of an electrical machine. In order to ensure that the attachment apparatus 37 on the winding tooth 30 latches in, or snaps into, the retaining region 26 of the slot 22, the attachment region 36 contains fine structures of cutouts 38 and formed-out regions 39. The grain structure of the attachment region 36 is therefore particularly disturbed during the stamping process. The attachment region 36 is thus not very suitable for carrying the magnetic flux. Furthermore, electrical short-circuits are formed between the individual laminates 31 of the yoke 21 and the winding tooth 30 in the regions of the holding points 40 between the attachment apparatus 37 and the slot 22. Flux elements illustrated by the arrow Φ1 in FIG. 2 would induce undesirable eddy currents in these short-circuit paths.

The route of the magnetic flux in the flux guidance region is thus influenced deliberately by local changes to the structural characteristics of the material. This makes use of the effect that, when the physical alignment of the individual grains is changed with respect to the external geometry of the winding tooth or of an individual element of the winding tooth, the magnetic orientation of the grains is also changed. The magnetic characteristics can thus be influenced locally and can be modulated in a desired, predetermined manner. The local change to the material characteristics can be carried out in many ways. This may be at the same time with or else independently of the shaping of the winding tooth or of an individual laminate of a winding tooth. The contour can in this case be designed such that, during the shaping process, for example by stamping, water-jet cutting or laser-beam cutting or some similar method, the material has its structural characteristics modified locally to a greater extent in the attachment region than in the flux guidance region. A structural change which results in deliberate control of the magnetic flux can also be carried out following the shaping of the winding tooth or of an individual element, however, by means of the known methods, in particular by laser radiation or else by particle bombardment, for example electron bombardment. The influencing of the characteristics need not necessarily be carried out in the region of an edge or in the lateral edge regions. It is also possible to change the structure of the laterally rut surface, which is particularly advantageous when using thin sheet-metal laminates with a thickness of less than one millimeter.

Thus, for the transitional element 35, the aim is to achieve a geometric structure in which all the magnetic lines of force cross over from the winding tooth 30 to the yoke 21 as illustrated by way of example by the arrow $\Phi 2$ in FIG. 2. The laminated core 20 structure illustrated in FIG. 2 is particularly suitable for this purpose since the magnetic reluctances in the fastening region 36 and in the transitional element 35 support Type $\Phi 2$ lines of force, and the attachment apparatus 37 remains largely free of magnetic lines of force. Owing to the high magnetic reluctance in the attachment region 36—owing to the small areas and large air gaps and the regions destroyed by the stamping process—the magnetic flux $\Phi 2$ attempts to find the path of least resistance, which means that, before entering the attachment region 36, it is transferred to the yoke 21 via the side walls 41 of the transitional element 35. The path via the transitional element 35 is associated with considerably reduced magnetic reluctance owing to the larger area and the simple stamped structure.

It is self-evident that the invention is not limited to the described specific exemplary embodiment, so that other connection options between the winding tooth 30 and the yoke 21 are also possible.

The deliberate changing of the grain structure, and thus the modification of the magnetic characteristics of a winding tooth, can, of course, also be carried out in other regions of the winding tooth in order to define the local profile of the magnetic flux, for example in the region of the tooth head or the winding supporting element. The magnetic flux guidance characteristics of a yoke of an electromagneto-mechanical converter can likewise also advantageously be changed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An electromagneto-mechanical converter comprising a yoke and a plurality of winding teeth attached to said yoke, each said tooth being composed of a material which can carry the magnetic flux of a magnetic circuit, said material having a grain structure, each said tooth comprising a winding support element for holding a winding;

an attachment region which attaches the tooth to the yoke; and a transition element which tapers from the winding support element to the attachment region, said transition element being immediately adjacent to the yoke wherein the grain structure of the material in the attachment region is disturbed so that the attachment region has a magnetic reluctance which is greater than the magnetic reluctance of the winding support element and the transition element, whereby magnetic flux which enters the transition element from the winding support element passes substantially from the transition element directly into the yoke, and the attachment region is substantially free of magnetic flux.

2. The electromagneto-mechanical converter as claimed in claim 1, wherein the material is soft-magnetic.

3. The electromagneto-mechanical converter as claimed in claim 1, wherein each said winding tooth comprises a plurality of individual plates which are connected together in a stack.

4. The electromagneto-mechanical converter as claimed in claim 1, wherein the grain structure of the material has a preferred direction.

5. The electromagneto-mechanical converter as claimed in claim 1, wherein the material is an oriented-grain metal.

6. The electromagneto-mechanical converter as claimed in claim 2, wherein the teeth are stamped from magnetic sheet steel.

7. The electromagneto-mechanical converter as claimed in claim 2, wherein the teeth are produced by one of stamping, water-jet cutting, and laser-beam cutting.

8. The electromagnet mechanical converter as claimed in claim 1, wherein the winding support element and the transition element together form a flux guidance region which is larger than the attachment region.

9. The electromagneto-mechanical converter as claimed in claim 1, wherein the attachment region comprises means for positively-locking the tooth to the yoke.

10. The electromagneto-mechanical converter as claimed in claim 9, wherein said means for positively locking the tooth to the yoke comprises a cutout separating a pair of resilient formed-out regions.

11. The electromagneto-mechanical converter as claimed in claim 1, wherein the winding supporting element has a tooth head at its free end facing away from the yoke.

12. The electromagneto-mechanical converter as claimed in claim 1, wherein a total of thirty-six said winding teeth are provided.

13. The electromagneto-mechanical converter as claimed in claim 1, wherein the yoke comprises a plurality of slots for holding the winding teeth.

14. The electromagneto-mechanical converter as claimed in claim 10, wherein each said slot has cutouts which correspond to the resilient formed-out regions.

15. The electromagneto-mechanical converter as claimed in claim 13, wherein the slots each have a tapering entry region and an adjacent retaining region which the attachment region of a respective winding tooth engages, and wherein the tapering entry region is designed to accommodate the tapering transitional element of the respective winding tooth.

16. The electromagneto-mechanical converter as claimed in claim 1, wherein the converter is a permanent-magnet synchronous machine.

* * * * *